United States Patent [19]

Clark

[11] 3,789,149

[45] Jan. 29, 1974

[54] CODE DIVISION MULTIPLEX SYSTEM

[75] Inventor: Adrian Percy Clark, Taplow, England

[73] Assignee: Plessey Telecommunications Research Company, Taplow, England

[22] Filed: June 9, 1972

[21] Appl. No.: 261,454

Related U.S. Application Data

[62] Division of Ser. No. 58,620, July 27, 1970, Pat. No. 3,688,048.

[30] Foreign Application Priority Data

July 30, 1969 Great Britain .................... 38273/69

[52] U.S. Cl. ......... 179/15 BC, 179/15 BW, 325/42, 325/65, 325/473

[51] Int. Cl. ............................................. H04j 3/00

[58] Field of Search...179/15 BC, 15 BW, 15 FS, 179/15 FO, 1.5 A; 325/320, 321, 42, 65, 473; 333/18 R, 28 R

[56] References Cited

UNITED STATES PATENTS

| | | | |
|---|---|---|---|
| 3,518,547 | 6/1970 | Filipowsky | 179/15 BC |
| 3,499,994 | 3/1970 | Lord | 179/15 BP |
| 1,590,362 | 6/1926 | Gibson | 179/15 BP |
| 3,522,383 | 7/1970 | Chang | 179/15 BC |

*Primary Examiner*—Kathleen H. Claffy
*Assistant Examiner*—David L. Stewart
*Attorney, Agent, or Firm*—Young & Thompson

[57] ABSTRACT

In digital transmission systems for use over H.F. radio links, the effects of multi-path propagation can be reduced by limiting the minimum duration of a signal element. The invention is concerned with a system for use when a transmission rate much greater than that which can be accommodated on a single channel if this minimum element duration is maintained. A code-division multiplex system is used. A first plurality of multi-level signals each represents a plurality of elements of the incoming signal. An orthogonal transformation matrix produces a second plurality of multi-level signals, the level of each of which is dependent on all said first plurality of multi-level signals. A time-division-multiplex signal is then produced from said second plurality of multi-level signals and used to modulate a carrier signal.

4 Claims, 6 Drawing Figures

FIG. 3

CODE DIVISION MULTIPLEX SYSTEM

This is a division, of application Ser. No. 58,620, filed July 27, 1970 now U.S. Pat. No. 3,688,048 issued Aug. 29, 1972.

This invention relates to code vidision multiplex electrical signalling systems.

In digital transmission systems for use over HF radio links, the effects of multi-path propogation can be reduced by arranging that the duration of a signal element is not less than about 10 milliseconds.

Where a transmission rate much greater than 100 bauds is required, the element duration can be maintained at 10 milliseconds by using a frequency division multiplex system with several 100-baud channels.

However, any such system has the disadvantage of high equipment complexity, particularly at the receiver.

According to one aspect of the invention, a transmitter, for use in an electrical signalling system in which digital signals are transmitted at a lower element rate than that of the signals to be transmitted, comprises first sampling means for sampling the input signal once during each element thereof, coding means responsive to said sampling means for producing a first plurality of multi-level signals each representing a plurality of elements of the incoming signal, matrix means comprising at least one orthogonal transformation matrix responsive to said coding means for producing a second plurality of multi-level signals, the level of each of which is dependent on all of said first plurality of multi-level signals, second sampling means responsive to said matrix means for producing a time-division-multiplex signal from said second plurality of multi-level signals and modulation means for modulating a carrier signal with said time division multiplex signal.

According to another aspect of the invention, a receiver for use in an electrical signalling system in which digital signals are transmitted at a lower element rate than that of the signals to be transmitted, comprises means for sampling the received signal once during each element thereof to produce a first plurality of multi-level signals, matrix means comprising at least one orthogonal matrix responsive to said sampling means for producing a second plurality of multi-level signals and decoding means responsive to said matrix means producing a plurality of signal elements from each multi-level element.

The term "orthogonal" is used herein in the sense which it is used in mathematics. In systems such as those with which the present invention is concerned, if a group of signals have no cross-correlation with each other, then the vectors representing these signals are orthogonal. If these vectors are supplied to an orthogonal transformation matrix, the output vectors are also orthogonal. Consequently, the signals represented by such output vectors have no cross-correlation with each other.

With the use of a system in accordance with the invention, the element duration of a transmitted signal can be maintained at 10 milliseconds by using several 100 baud channels. The signal codes used are chosen so as to ensure that there is approximately constant amplitude over each signal element. The multiplexing of the 100 baud channels at the transmitter is preferably carried out on base band signals and the resultant of total base band signal is used to modulate the signal carrier. At the receiver, the base band signal is then recovered from the received signal prior to separation into the individual 100 baud channels. In this way, only a single process of modulation and a single process of demodulation is required in a one way link.

A system of this type also enables relatively high transmission rates to be achieved economically over telephone circuits.

One embodiment of the invention uses synchronous orthogonal multiplexing of 15 quarternary baseband signals, where the components of a vector representing the 16 independent sample values of an individual signal-element, all have the same magnitude.

The element duration is 20 milliseconds, giving an element rate of 100 bauds and a total transmission rate of 3,000 bits per second over a standard voice-frequency channel.

There are 16 orthogonal vectors representing the 16 baseband signal-elements which are all orthogonal. The 16 100-baud signals are of course always in element-synchronism. The first of the 16 vectors has all components (sample values) equal, and is not used for data. Instead, the value of its 16 components is held constant. Since the other 15 signal-vectors are orthogonal to this vector, they contain no d.c. component over the duration of a signal element, regardless of their element values. Thus the d.c. component of the resultant (total) baseband signal, which is obtained by adding together the 16 individual baseband signals, is determined entirely by the first signal-vector and is unaffected by the element values of the other signals.

The resultant (total) baseband signal is used to modulate a signal carrier to give a double-sideband suppressed-carrier amplitude-modulated signal. This signal contains a low-level carrier component whose level is constant and is determined by the magnitude of the first signal-vector.

The carrier component can be used at the receiver to generate a reference carrier, by means of which coherent detection of the received signal is achieved for any data signal transmitted, that is for any combination and sequence of element values. There is furthermore no need for differential coding of the transmitted signals.

The carrier component is also used at the receiver to control the gain of the automatic-gain-controlled amplifier, so that the latter operates correctly with any received data signal.

A further advantage of this embodiment is that once the receiver is correctly synchronised to the received signal, synchronization is maintained regardless of the data signal transmitted and without the transmission of a separate timing signal.

The arrangement is therefore a fully transparent synchronous system, in the sense that any data signal may be transmitted.

Since only one of the 16° of freedom available for a signal element is not used for data, a very efficient use of the available bandwidth can be achieved.

Multiplexing and demultiplexing of the baseband signals can be adhieved very simply by means of resistor matrices. Because of this and since only one process of modulation and demodulation is involved in a one-way link, with no special filtering or correlative coding of the transmitted signal, no great equipment complexity is involved.

In a further development of the arrangement just outlined, time gaps are introduced between successive total-signal-elements during which intervals only the constant-level carrier component and no data signals are transmitted. In an element detection process at the receiver the detector is only operative over the data-carrying portion of an element and so ignores the signal received during any time gap. By using time gaps of sufficiently long duration, inter-symbol interference between the different received total-elements may be effectively eliminated, so that the latter are orthogonal. Under these conditions a considerable degree of attenuation and delay equalisation of the transmission-path frequency-characteristics may be carried out by suitable modifications to the resistor values in the matrix used to demultiplex the baseband signals at the receiver. Only a limited degree of equalization need therefore be carried out in the receiver input filter with a consequent reduction in equipment complexity. This arrangement should be particularly effective in applications of high-speed data transmission over private telephone lines. The transmission rate of the system may be doubled by transmitting two modulated-carrier signals which have the same carrier frequency 1,600 Hz but are in phase quadrature (at 90°). The two sets of 15 code-division-multiplexed signals are therefore orthogonal over any element detection period.

The invention will be more readily understood from the following more detailed description of the embodiment outlined above taken in conjunction with the accompanying drawings, in which:

FIG. 1 is a block schematic diagram of a transmitter for a 100-baud signal element system.

FIG. 2 comprises a series of waveform diagrams illustrating the operation of the transmitter shown in FIG. 1.

FIG. 3 is a block schematic diagram of a receiver for use with the transmitter shown in FIG. 1.

FIG. 4. comprises a series of waveform diagrams illustrating the operation of the receiver shown in FIG. 3.

In the following description, a negative level of a binary coded signal represents an element "1" and a positive level an element "0." In a timing or sampling waveform, the timing or sampling instants respectively are given by the negative-going transitions.

Figure 1:
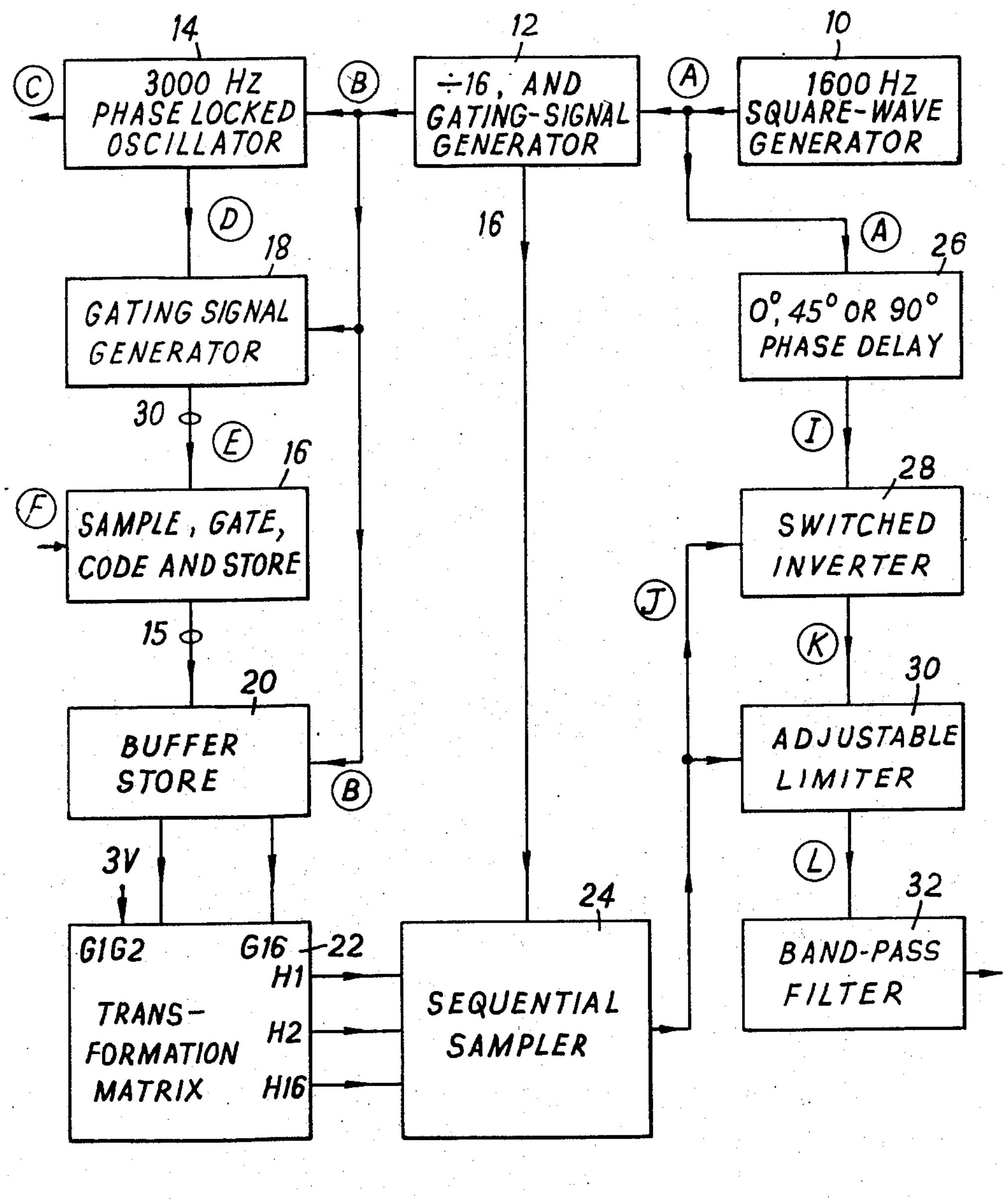
Figure 2:
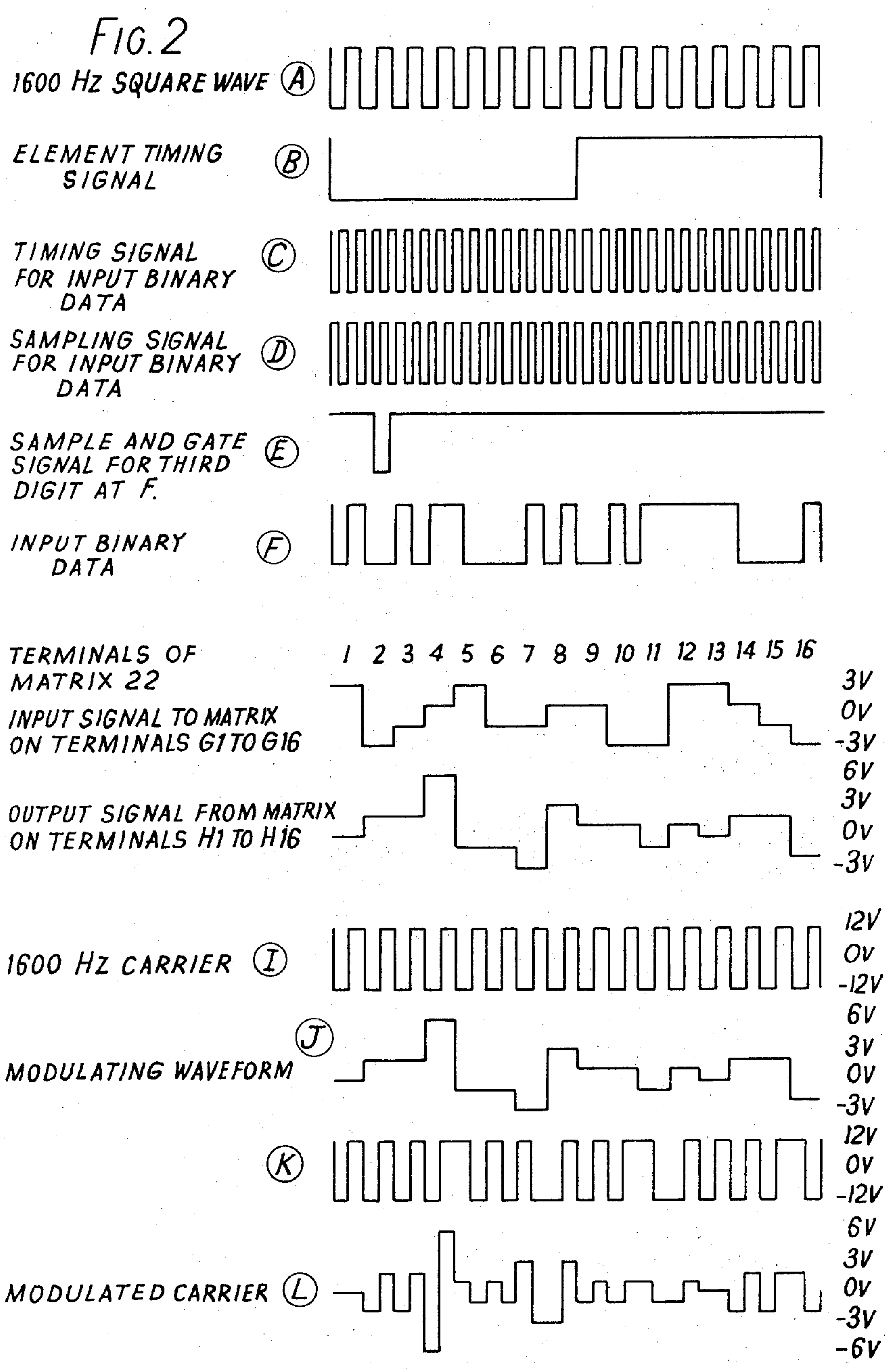

Referring to FIGS. 1 and 2, a 1,600 Hz square-wave at terminal A, produced by a square-wave generator 10, is fed as a timing signal to a combined divide-by-16 circuit and gating-signal generator 12. The resulting 100 Hz element timing waveform at an output terminal B of the unit 12 determines the boundaries of the transmitted 100-baud signal elements.

A 3,000 Hz phase-locked oscillator 14 has an input connected to the terminal B so that it is synchronized to the element timing waveform and produces an output on terminal C which is used to synchronize the input binary data which is fed, at 3,000 bauds on a terminal F to a sample, gate, code and store circuit 16.

A gating-signal generator 18 is fed from a second output terminal D of the oscillator 14 and phased by the element timing waveform at terminal B. The gating signal generator 18 has 30 output terminals E. Each of these carries a different sampling pulse, which contains a respective one of the 30 negative-going transitions in the waveform on terminal D over the duration of a 100-baud element. During the duration of a 100-baud element, 30 input binary elements are received in the sample, gate, code and store circuit 16, via terminal F. Each of the thirty sampling pulses samples a different one of these elements as its mid-point and gates the sampled pulse into the appropriate code and store circuit. There are 15 code and store circuits. The 30 input binary elements are divided into adjacent pairs. A code and store circuit converts the corresponding pair of input binary elements into a four-level element which is held in the store until replaced by the appropriate signal in the next 100-baud element period. The sign of the stored four-level element is the same as that of the first of the two corresponding input binary elements. Its level is 3 volts or 1 volt, depending upon whether the sign of the second binary element is positive or negative respectively.

The sample, gate, code and store circuit 16 has 15 output connections to a buffer store 20. At a negative-going transition of the element timing waveform, which marks the end of a 100-baud element period, the 15 four-level elements stored in the sample, gate, code and store circuit 16 are automatically transferred to the buffer store 20, where they are held until the end of the next 100-baud element period. The buffer store 20 has 15 output terminals which are connected respectively to the input terminals G2 to G16 of a transformation matrix 22. A constant 3-volt signal is applied to the input terminal G1.

Let the 16 input signals to the 16 × 16 transformation matrix unit 22 be represented by the components of a column − vector $X=(xj)$, the 16 output signals by the components of a column-vector $Y=(yi)$, and the mathematical equivalent of the matrix 22 by H. Then $$HX=Y \quad (1)$$

$$\text{where } H=\tfrac{1}{4}\left\{\begin{array}{cccccccccccccccc}
1 & 1 & 1 & 1 & 1 & 1 & 1 & 1 & 1 & 1 & 1 & 1 & 1 & 1 & 1 & 1\\
1 & -1 & 1 & -1 & 1 & -1 & 1 & -1 & 1 & -1 & 1 & -1 & 1 & -1 & 1 & -1\\
1 & 1 & -1 & -1 & 1 & 1 & -1 & -1 & 1 & 1 & -1 & -1 & 1 & 1 & -1 & -1\\
1 & -1 & -1 & 1 & 1 & -1 & -1 & 1 & 1 & -1 & -1 & 1 & 1 & -1 & -1 & 1\\
1 & 1 & 1 & 1 & -1 & -1 & -1 & -1 & 1 & 1 & 1 & 1 & -1 & -1 & -1 & -1\\
1 & -1 & 1 & -1 & -1 & 1 & -1 & 1 & 1 & -1 & 1 & -1 & -1 & 1 & -1 & 1\\
1 & 1 & -1 & -1 & -1 & -1 & 1 & 1 & 1 & 1 & -1 & -1 & -1 & -1 & 1 & 1\\
1 & -1 & -1 & 1 & -1 & 1 & 1 & -1 & 1 & -1 & -1 & 1 & -1 & 1 & 1 & -1\\
1 & 1 & 1 & 1 & 1 & 1 & 1 & 1 & -1 & -1 & -1 & -1 & -1 & -1 & -1 & -1\\
1 & -1 & 1 & -1 & 1 & -1 & 1 & -1 & -1 & 1 & -1 & 1 & -1 & 1 & -1 & 1\\
1 & 1 & -1 & -1 & 1 & 1 & -1 & -1 & -1 & -1 & 1 & 1 & -1 & -1 & 1 & 1\\
1 & -1 & -1 & 1 & 1 & -1 & -1 & 1 & -1 & -1 & 1 & 1 & -1 & 1 & 1 & -1\\
1 & 1 & 1 & 1 & -1 & -1 & -1 & -1 & -1 & -1 & -1 & -1 & 1 & 1 & 1 & -1\\
1 & -1 & 1 & -1 & -1 & 1 & -1 & 1 & -1 & 1 & -1 & 1 & 1 & -1 & 1 & -1\\
1 & 1 & -1 & -1 & -1 & -1 & 1 & 1 & -1 & -1 & 1 & 1 & 1 & 1 & -1 & -1\\
1 & -1 & -1 & 1 & -1 & 1 & 1 & -1 & -1 & 1 & 1 & -1 & 1 & -1 & -1 & 1
\end{array}\right\}=\tfrac{1}{4}(h_{ij}) \quad (2)$$

The matrix $(h_{ij})$ is a Hadamard Matrix. H is orthogonal and symmetric. From equation 1, $$y_i=\sum_{j=1}^{16} \tfrac{1}{4}h_{ij}x_j, \text{ for } i=1, \ldots, 16 \quad (3)$$

The simplest practical arrangement for the matrix 22 is achieved by providing at its input the 16 signals shown and their negatives. Each output signal is now obtained by summing the appropriate input signals after each of these has been reduced to a quarter of its original magnitude. No process of inversion is required in the matrix 22 and the same attenuation is applied to each input signal.

Because of the one element delay imposed by the buffer store 20, the input and output signals for the matrix 22 and the waveforms at terminals J to L shown in FIG. 2, are those obtained during the 100-baud element period immediately following that for the waveforms shown at the terminals A to F.

The divide-by-16 and gating signal generator 12 has 16 output terminals each of which supplies different gating signals to a sequential sampler 24. These 16 gating signals divide a 100-baud element period into sixteen consecutive periods each of duration 0.625 milliseconds. Each of these terminals is negative during a different 0.625 millisecond period over the duration of a 100-baud element, and positive for the rest of the time. Thus at any one instant only one of the 16 terminals is negative. Each of these terminals is allocated to a different one of the output terminals H1 to H16 of the matrix 22. While the voltage at a terminal G1 is positive, the signal at the corresponding output terminals H1 of the matrix 22 is blocked in the sequential sampler 24. Thus the 16 output signals from the matrix 22, over a 100-baud element period, appear sequentially and in the order of the terminal numbers at the output terminals of the sequential sampler 24.

The output on terminal A from the square-wave generator 10 is also applied to phase-delay circuit 26 which applies a phase shift of either 0°, 45° or 90°. In FIG. 2, a 0° phase shift is assumed.

The output from the phase delay circuit 26 on terminal I is applied to a switched inverter 28 through which it is passed unchanged when the signal at J is positive and it is inverted when the signal at J is negative. When the signal at J is zero, the switched inverter 28 remains in its previous state. The output of the switched inverter 28 is applied on terminal K to an adjustable limiter 30 where its amplitude is limited to the amplitude of the modulating waveform at terminal J, no distinction being made here between a positive or negative signal at J.

The resultant modulated carrier at terminal L is fed through a band-pass filter 32 which restricts its spectrum to the available frequency band over the transmission path.

The transmitter is entirely digital and need involve no complex circuits. The matrix 22 contains a resistor network of 256 resistors, together with 16 transistor circuits, one for each output.

For correct operation of the system there must be an integral number of carrier cycles in each digit (or gating) period of the modulating waveform at J. A digit period is here 0.625 milliseconds and contains exactly one carrier cycle.

Figure 3:
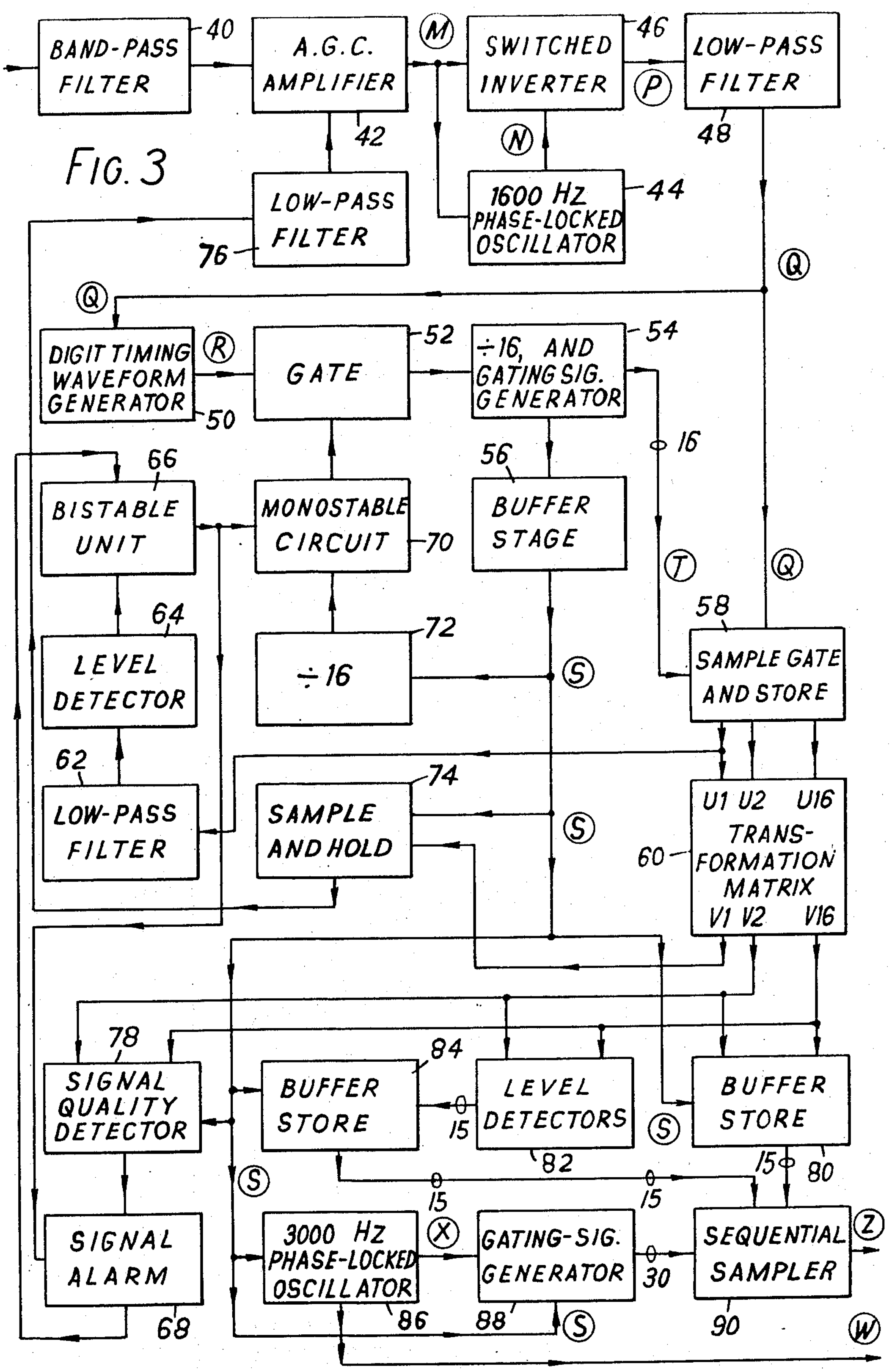
Figure 4:
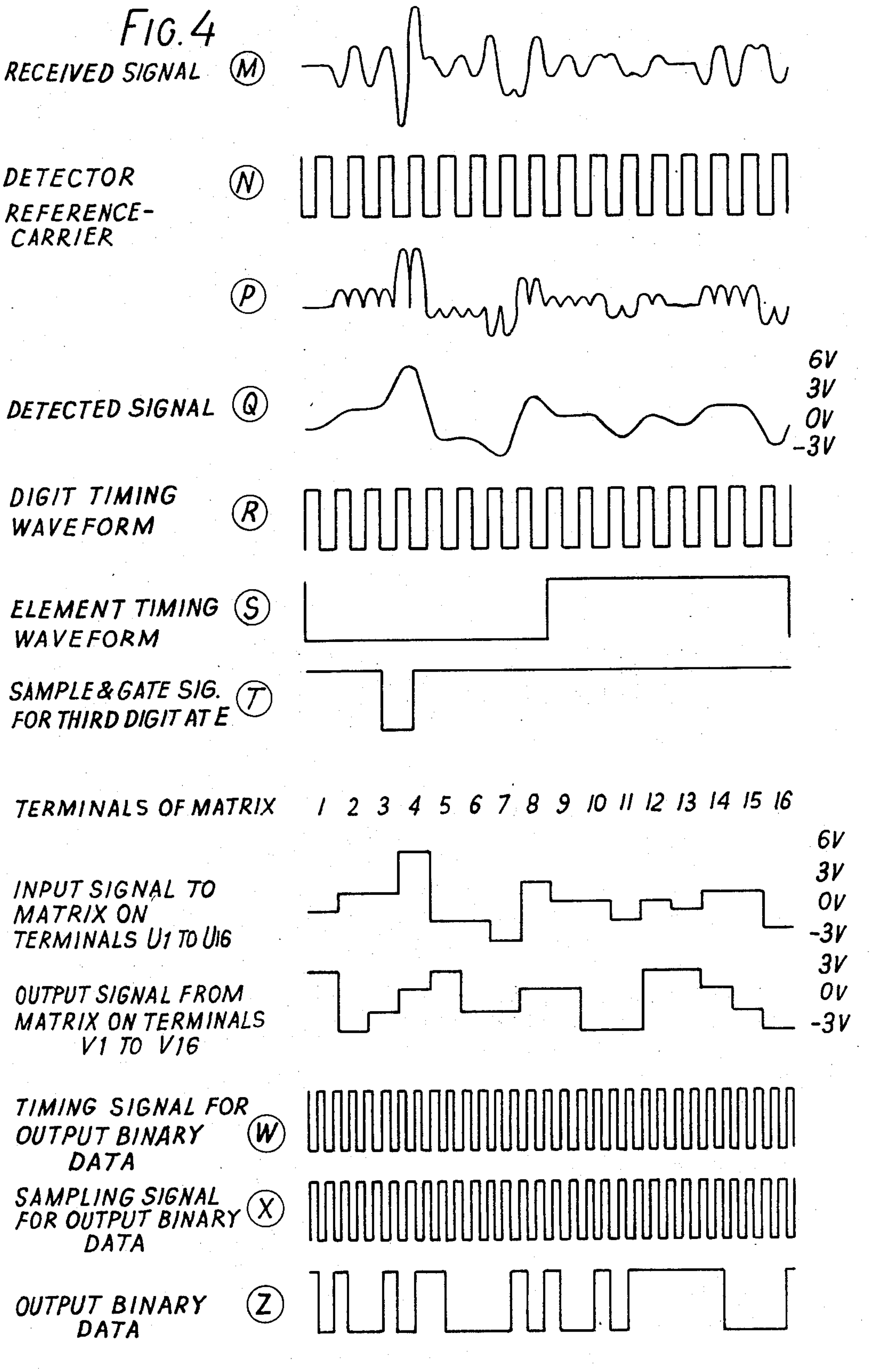

Referring now to FIGS. 3 and 4, in a receiver for use in conjunction with the transmitter shown in FIG. 1, a band-pass filter 40 at the receiver input removes any noise or other components outside the signal frequency band. The level of the resultant signal is adjusted to its required value, in an automatic-gain-controlled (a.g.c.) amplifier 42, to give the signal at terminal M (see FIG. 4).

The carrier-frequency component of this signal is extracted and shaped in a 1,600 Hz phase-locked oscillator 44. Where the maximum frequency-deviation introduced in the transmission path is only a very small fraction of the signal carrier frequency, a simple narrow-based filter (tuned circuit) followed by an amplifier limiter, may be used in place of the phase-locked oscillator 44.

The signal on terminal M is also applied to a switched inverter 46 which passes such signal through unchanged when the signal at the output terminal N of the oscillator 44 is positive, and inverts the signal at M when the signal at N is negative. The resultant signal at output terminal P of the switched inverter 46 is filtered by a low-pass filter 48 to give the detected signal on lead Q. The latter signal is a 1,600-baud 49-level base-band signal. To simplify FIG. 4, the waveform on the lead Q is shown somewhat advanced in phase. An element of this signal will be referred to as a "digit" in order to avoid confusion with other signals.

The signal on lead Q is applied to a digit timing waveform generator 50 which comprises a phase-locked oscillator. The transitions in the signal on the lead Q are used to control the phase of the output square-wave signal of this phase-locked oscillator, so that a negative transition in the output thereof occurs at the mid-point of the corresponding digit in the signal on lead Q. The signal on the lead Q cannot have more than thirty consecutive digits with no change in voltage (no transitions), so that the digit timing waveform generator 50 always has an adequate phase control, regardless of the data signals transmitted. The digit timing waveform generator 50 is automatically brought into the correct phase when a signal is first received.

The digit timing waveform at output terminal R of the digit timing waveform generator 50 is fed via a gate 52 to a divide-by-16 circuit and gating-signal generator 54. One output of this last mentioned unit 54 is a 100 Hz square-wave, which is delayed by exactly half a digit period in a buffer stage 56, to give the element timing waveform on lead S.

The divide-by-16 circuit and gating signal generator 54 has 16 other output terminals T, each of which carries a different sampling pulse, coincident with a different one of the 16 negative-going transitions in the digit timing waveform at the output of the gate 52, over the duration of a 100-baud element. During this period, 16 digits are received on lead Q. Each of the terminals T is associated with a different capacitor store in a sample, gate and store circuit 58. The sample gate and store circuit 58 is arranged so that each digit is sampled at its mid-point by a different sampling pulse and to store it in the corresponding capacitor store. Each digit is held in its store until replaced by the corresponding digit in the next 100-baud element period.

At the end of a 100-baud element period, which is marked by one of the negative-going transitions in the element timing waveform, the 16 output signals from the sample, gate and store circuit 58 contain the 16 digit values for the element just received. Each of these signals is fed to the respective one of the input terminals U1 . . . U16 of a transformation matrix 60. The matrix 60 has 16 output terminals V1 . . . V16, the signals on which at the end of a 100-baud element period are the detected values of the 16 multiplexed 100-baud four-level elements. The input and output signals shown for the matrix 60 in FIG. 4, are those at the second of the two negative-going transitions shown for the element timing waveform at S. The element timing waveform is sufficiently delayed in the buffer stage 56 to ensure that the sixteenth input signal to the matrix 60 has reached its correct value and the 16 output signals have stabilized, before the negative-going transition of S is received.

In order to bring the element timing waveform into the correct phase at the start of a transmission, the input data to the transmitter is set to all "0's" and held in this condition for about 7 seconds. In the absence of noise and distortion, the first digit in a group of 16 on lead Q has a value of 12 volts at its mid-point and the remaining digits are all zero. The element timing waveform initially has an arbitrary phase, such that there is, in general zero volts at the input terminal U1 of the transformation matrix 60.

The input to terminal U1 of the matrix 60 is also connected to a low-pass filter 62 the output of which is connected to a level detector 64. When the input signal to the level detector 64, is below 9 volts, the output signal from the level detector is at 5 volts. When the input signal is greater than 9 volts, the output signal is at zero volts. Thus, since initially there is a zero volts input to the low-pass filter 62 and consequently a zero volts output therefrom, there is initially 5 volts at the output of the level detector 64. It is assumed here that there is zero attenuation of a d.c. voltage signal across the low-pass filter 62.

The output of the level detector 64 is connected to a bistable circuit 66 which is automatically set to the "off" condition, with an output signal of 5 volts, when the signal at a second input thereto is switched from 5 to zero volts. This second input is provided by a signal-alarm circuit 68 the output of which is switched from 5 volts to zero volts indicating either loss of the received signal or loss of element synchronization, over a minumum period of 5 seconds, as will be explained hereinafter. A signal of 5 volts from the signal alarm circuit 68 has no effect on the bistable circuit. The signal from the signal alarm circuit 68 is differentiated at the input to the bistable circuit 66 and the differentiated signal resulting from a transition from 5 to zero volts is arranged to hold the bistable circuit 66 in the "off" condition for a period of about 1 second. During this period the bistable circuit is unaffected by the signal from the level detector 64. After this period, although the output from the signal alarm circuit 68 remains at zero volts as long as loss of signal or element synchronization is detected, it has no further effect on the bistable circuit until the signal next undergoes a transition from 5 to zero volts. The bistable circuit is set to the "on" condition when the output from the level detector 64 changes from 5 to zero volts, and it remains in this condition until next set to the "off" condition by the signal alarm circuit 68.

Whenever the bistable circuit 66 is set to the "on" condition, to give zero volts at its output, this sets the signal alarm circuit 68 to the "off" condition, after which it has no further effect on the signal alarm circuit until the next transition from 5 to zero volts thereof.

The output of the bistable circuit 66 is connected to a monostable circuit 70 which also has a second input connected via a divide-by-16 circuit to the output of the buffer stage 56 on lead S. When the bistable circuit 66 is in the "off" condition it permits the normal operation of the monostable circuit 70. The latter is triggered by a negative-going transition at the output of the divide-by-16 circuit 72, which occurs after every 16 100-baud elements. The output signal of the monostable circuit 70, which is applied to a second input of the gate 52, is at zero volts except after being triggered, when it is set to 5 volts, and remains there for 1.25 times the duration of a digit on lead Q, that is nominally 0.781 milliseconds. The digit timing waveform at the first input to the gate 52 switches between 5 and zero volts. The output of the gate is at 5 volts except when both inputs are at zero volts, in which case it is also at zero volts. Thus each time the monostable circuit operates, it removes one timing pulse (negative-going transition) from the digit timing waveform at the output of the gate 52 and so changes the phase of the element timing waveform on lead S and of the gating signals on the leads T, by the corresponding amount.

When the element timing waveform reaches the correct phase, the first digit in a group of 16 on lead Q is fed to the input terminal U1 of the matrix 60. The voltage here is now 12 volts. After 12 100-baud elements have been received under these conditions, the signal at the output of the low-pass filter 62 will normally have just exceeded 9 volts and set the output signal of the level detector 64 to zero volts. This sets the bistable circuit 66 to the "on" condition, giving zero volts at its output and inhibiting the operation of the monostable circuit 70. Provided that the bistable circuit is set to the "on" condition before the next negative-going transition occurs at the output of the divide-by-16 circuit 72, the monostable circuit is held "off." Thus no further phase change is applied to the element timing waveform until either the received signal is cut off or synchronization of the element timing waveform is lost.

If, due to excessive noise, the signal at the output of the low-pass filter 62 does not reach 9 volts within the duration of 16 100-baud elements, the phase of the element timing waveform will continue to be changed until the next time it is correct, when the correct phase will normally be recognized and held. In the absence of a received signal the bistable circuit 66 is in the "off" condition and the noise signal at the output of the low-pass filter 62 is unlikely to exceed 9 volts and so operate the level detectors 64 and set the bistable circuit 66 to the "on" condition.

In the absence of noise and distortion, the signals at the 16 input terminals U1 . . . U16 of the transformation matrix 60, at a negative-going transition of the element timing waveform, are the 16 components of the corresponding column-vector Y at the transmitter. Thus the output signal-vector from the matrix 60 at this instant is $$HY = H^2X = X, \tag{4}$$

since $$Y = HX \tag{5}$$

and $$H^2 = I, \tag{6}$$

where H is the mathematical equivalent of the matrix 60 and I is the identity matrix.

The signal at the output terminal V1 of the matrix 60 is sampled at each negative-going transition of the element timing waveform and stored until the next negative-going transition, in a sample and hold circuit 74. The output signal from this circuit is filtered in a low-pass filter 76 and used to control the gain of the a.g.c.

amplifier 42. At a negative-going transition of the element timing waveform, the signal at the output terminal V1 of the matrix 60 is ideally the same as the input signal at terminal G1 of the corresponding matrix 22 at the transmitter, namely 3 volts. The a.g.c. loop is designed to hold the average value of the sampled signal voltage at the output terminal V1 of the matrix 60, as near to 3 volts as possible, and so give the required output signals from the matrix 60.

Since the average value of the sampled signal voltage at the output terminal V1 of the matrix 60 is independent of the phase of the element timing waveform, correct operation of the a.g.c. loop will be obtained during the adjustment of the phase of the element timing waveform.

Since the a.g.c. loop is designed to give a constant 3 volt signal at the output terminal V1 of the matrix 60, the signals at the output terminals V2 . . . V16 each normally have one of the values ± 1 volt and ± 3 volts at a negative going transition of the element timing waveform. In the absence of the received signal or when the element timing waveform is in the incorrect phase, there is a much higher probability that at least one of these 15 signals has a value in the neighbourhood of zero volts, than when the receiver is operating correctly. Each time one of the fifteen output signals at the terminals V2 . . . V16 of the matrix 60 has a value in the range −0.3 to +0.3 volts, at a negative going transition, of the element timing waveform, an error is counted by the signal quality detector 78. The latter determines the error rate for each of the 15 signals, where the measured error rate at any instant is proportional to the number of errors counted in the preceding five seconds. If one or more of the measured error rates exceeds a given threshold level, the signal alarm circuit 68 is operated to send a zero volts signal to the bistable circuit 66, setting it to the "off" condition. Once set to zero volts, the output signal of the signal alarm circuit 68 remains in this condition until set to 5 volts by a transition from 5 to zero volts of the output of the bistable circuit 66. Once set to 5 volts, the output signal of the signal alarm circuit 68 remains in this condition until set to zero volts by the signal quality detector 78. Following a transition it is held in its new state for 5 seconds before another transition is permitted to occur.

Immediately a transition from 5 to zero volts is obtained at the output of the signal alarm circuit 68 a request signal is sent back to the transmitting end for a synchronizing signal of all "0's" at the transmitter input.

The fifteen signals at the output terminals V2 . . . V16 of the matrix 60 are also fed both to a buffer store 80 and a level detector unit 82.

The buffer store 80 contains 15 bistable circuits, each of which is fed from a different output signal of the matrix 60. At each negative-going transition in the element timing waveform on lead S each bistable circuit is set to give an output signal having the same sign as its input signal.

The level detector unit 82 contains 15 level detectors, each of which is fed from a different output signal of the matrix 60. The sign of the output signal of a level detector is the same as that of the difference between the magnitude of the input signal and 2 volts. If the magnitude of the input signal is greater than 2 volts, the level-detector output signal is positive. If it is less than 2 volts, the output signal is negative.

The output of each level detector in the unit 82 is connected to a respective one of 15 bistable circuits in a second buffer store 84. At a negative-going transition in the element timing waveform on lead S, each bistable circuit is set to give an output signal having the same sign as its input signal.

During a 100-baud element period, the output signals from the two bistable circuits, one in the buffer store 80 and the other in the buffer store 84, which are fed from the nth output terminal of the matrix 60, are the input binary data signals Nos. **2*n*-3 and 2*n*-2** respectively, in the corresponding group of thirty of the latter signals at the transmitter.

A 3,000 Hz phase-locked oscillator 86 is synchronized to the element timing waveform on lead S. One of its two output signals is fed as the timing signal at terminal W to the equipment associated with the receiver. The other of its output signals is fed on lead X to a gating-signal generator 88. The latter is phased by the element timing waveform at S and has thirty output terminals. Each of these carries a different sampling pulse over the duration of a 100-baud element, and over this period each sampling pulse has a different one of the 30 negative-going transitions in the waveform at X.

The sampling pulses from the gating signal generator 88 are fed to a sequential sampler 90 where each is associated with a different output terminal from the buffer stores 84 and 80, in such a way that the thirty output signals from the buffer stores 84 and 80 are sampled sequentially and in the correct order, to give the output binary data signal at terminal Z.

Another embodiment will now be described with reference to FIGS. 5 and 6. This can be operated at 4,800 bits/seconds over good private lines. The method of operation is the same as that of the previous system, except where modified as follows. The transmitted digit rate remains at 1,600 digits/second with a 1,600 Hz carrier, but the element rate is reduced from 100 to 80 bauds. Thus each signal element contains 20 digits. There are 30 synchronously multiplexed 80-baud channels, these being in two groups, each with 15 code-division-multiplexed signals. The two groups are orthogonally multiplexed by arranging their 1,600 Hz carriers to be in phase quadrature (at 90°). The 30 individual signal-elements, transmitted over any 80-baud element period, are orthogonal.

Figure 5:
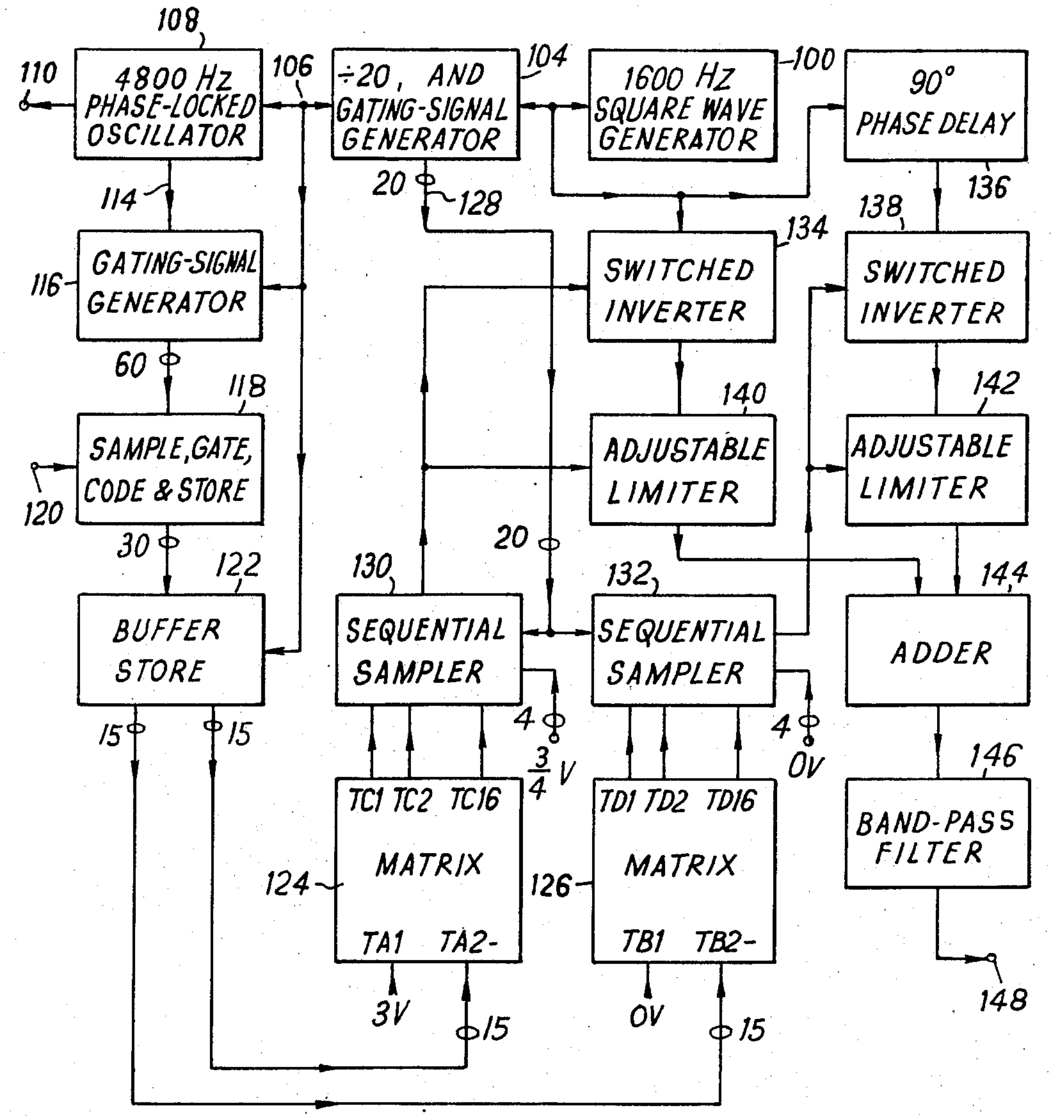
FIG. 5 is a block schematic diagram of a transmitter for a 4,800 bit/second system.

The transmitter for this system is shown in FIG. 5.

The output of a 1,600 Hz square-wave generator 100 is fed as a timing signal to a divide-by-20 circuit and gating-signal generator 104. One output of the latter, which comprises a 80 Hz square-wave element-timing-waveform at terminal 106, determines the boundaries of the transmitted 80-baud signal elements.

The element timing waveform at terminal 106 is fed to a 4,800 Hz phase-locked oscillator 108 an output of which on terminal 110, is used to synchronize the input binary data which is fed to terminal 120 at 4,800 bauds.

Another output from the 4,800 Hz oscillator on terminal 114, which is in anti-phase (at 180°) with the output on terminal 110, is fed to a gating-signal generator 116 which is phased by the element timing waveform at terminal 106. The gating signal generator 116 has 60 output terminals. Each output terminal of the gating signal generator 116 carries a different sampling pulse, containing a respective one of the 60 negative-going transitions in the waveform at the terminal 114, over the duration of an 80-baud element. During this period, 60 input binary elements are received in the sample gate, code and store circuit 118 via terminal 120. Each of the 60 sampling pulses samples a different one of these elements as its midpoint and gates the sampled pulse into the appropriate code and store circuit. There are 30 code and store circuits. The sixty input binary elements are divided into adjacent pairs. A code and store circuit converts the corresponding pair of input binary elements into a four-level element which is held in the store until replaced by the appropriate signal in the next 80-baud element period. The sign of the stored four-level element is the same as that of the first of the two corresponding input binary elements. Its level is 3 volts or 1 volt, depending upon whether the sign of the second binary element is positive or negative respectively.

At a negative-going transition of the element timing waveform, which marks the end of an 80-baud element period, the 30 four-level elements stored in the sample, gate, code and store circuit 118 are automatically transferred to a buffer store 122, where they are held until the end of the next 80-baud element period of the 30 output terminals of the buffer store, 15 are connected to the input terminals TA2 . . . TA16 of a transformation matrix 124 while the other 15 are connected to the input terminals TB2 . . . TB16 of a second transformation matrix 126. The two transformation matrices 124 and 126 are arranged to carry out the same mathematical operation. For $1 \leq n \leq 15$, the nth output signal from the buffer store is connected to the $(n+1)$ th input terminal of the second matrix 126 (whose input terminal TB1 is fed with zero volts) and for $16 \leq n \leq 30$, the $n$th output signal from the buffer store is connected to the $(n-14)$ th input terminal of the first matrix 124. (whose input terminal TA1 is fed with 3 volts).

In addition to the terminal 106, the divide-by-20 circuit and gating signal generator 104 has 20 other output terminals 128 each of which carry a different gating signal. These gating signals divide an 80-baud element period into 20 consecutive periods each of duration 0.625 milliseconds. Each of these terminals 128 is negative during a different 0.625 millisecond period over the duration of an 80-baud element, and positive for the rest of the time. Thus at any one instant only one of the 20 terminals 128 is negative. Each of the 16 terminals 128, which are negative for a part of the first 10 milliseconds of a 12.5 millisecond (80-baud) element period, is allocated to a different output terminal of each of the matrices 124 and 126.

The output terminals TC1 . . . TC16 of the matrix 124 are connected to a sequential sampler 130. Similarly the output terminals TD1 . . . TD16 of the matrix 126 are connected to a sequential sampler 132. While the voltage at a terminal 128 is negative, the signal at the corresponding output terminal of each of the matrices 124 and 126 is allowed to pass unchanged through the sequential sampler. While the voltage at a terminal 128 is positive, the signal at the corresponding output terminal of each of the matrices 124 and 126 is blocked in the associated sequential sampler 130,132. Over the first 10 milliseconds of an 80-baud element period, the 16 output signals from each of the matrices 124 and 126 appear at the output terminal of the corresponding sequential sampler, sequentially and in the order of their terminal numbers. Thus at any instant during this period, the output signal from each sequential sampler 130, 132 is the signal at the appropriate output terminal of the corresponding matrix 124, 126. During the last 2.5 milliseconds of an element period, the sequential sampler 130 has an output of ¾ volts while the sequential sampler 132 has an output of zero volts.

The output of the 1,600 Hz square wave generator 100 is also connected directly to a first switched inverter 134 and via a 90° phase-delay circuit 136 to a second switched inverter 138. The outputs of the switched invertors 134 and 138 are connected to respective adjustable limiters 140 and 142.

Each switched inverter 134, 138 and adjustable limiter 140,142 operates in the same way as the switched inverter 28 and adjustable limiter 30 of FIG. 1 and gives an output signal which is a suppressed carrier amplitude-modulated signal. There is a phase shift of 90° between the square-wave carriers of the two output signals. These waveforms are added together by an adder 144 and filtered by a band-pass filter 146, to give a signal on terminal 148 whose spectrum is limited to the frequency band available over the transmission path.

The transmitter output signal at the terminal 148 contains two suppressed-carrier amplitude-modulated signals, with their 1,600 Hz carriers in phase quadrature. The modulating waveforms used for these two signals are derived from the two matrices 124 and 126. For any transmitted data, the first of the two modulating waveforms (derived from the matrix 124 which has 3 volts at the input terminal TA1) contains a fixed d.c. component over any 80-baud element, whereas the second of the two modulating waveforms (derived from the matrix 126 which has zero volts at the input terminal TB1), contains no d.c. component over any 80-baud element. Thus the first of the two modulated carriers at the terminal 148 contains a 1,600 Hz carrier component of fixed level whereas the second of the modulated carriers at the terminal 148 contains no 1,600 Hz carrier component, regardless of the data transmitted. The resultant signal at terminal 148 therefore contains a 1,600 Hz carrier component of fixed level, either in phase or in anti-phase with the signal carrier in any digit (a twentieth of an 80-baud element) of the first of the two modulated carriers at the terminal 148. This carrier component is used at the receiver to derive the two reference carriers needed to achieve coherent detection of the two modulated carriers in phase quadrature. It is also used to control the gain of the a.g.c. amplifier.

The received signal (FIG. 6) is filtered and amplified by a band-pass filter 150 and an a.g.c. amplifier 152 respectively. The output from the amplifier 152 is fed to the 1,600 Hz phase-locked oscillator 156. This extracts the carrier frequency component to give a 1,600 Hz sine-wave at terminal 158, in phase with the 1,600 Hz carrier component at terminal 154. The sine-wave at terminal 158 is multiplied by the signal at terminal 154, in a linear multiplier 160. The 1,600 Hz sine-wave at terminal 158 is also supplied to a 90° phase delay circuit 162 and the resultant sine-wave multiplied by the signal at terminal 154 in a linear multiplier 164.

The output signal of the linear multiplier 160 is filtered in a low-pass filter 166, whose output signal is a 1,600 baud baseband signal. As before, an element of this signal is referred to as a "digit," in order to avoid confusion with other signals. The low-pass filter 166 passes only frequencies up to about 1,600 Hz.

The output from the low pass filter 166 is supplied to a digit timing waveform generator 168 where transitions in the input signal thereto are used to control the phase of the output square-wave signal of a phase-locked oscillator therein, so that a negative-going transition in this waveform occurs at the end of the corresponding digit at the output of each linear multiplier. The output signal from the low-pass filter 166 cannot have more than 15 consecutive digits with no change is voltage (no transitions) as a result of the particular baseband signals used at the transmitter.

The digit timing waveform from the digit timing waveform generator 168 is fed via a gate 170 to a divide-by-20 circuit and gating-signal generator 172. The output signal from the latter on terminal 174 is an 80 Hz square-wave, which is delayed by exactly half a digit period in a buffer stage 176, to give the element timing waveform on lead 178.

The divide-by-20 circuit and gating signal generator 172 has 16 other output terminals 179. Over the first 10 milliseconds of an 80-baud element period, each of the 16 terminals 179 carries a different sampling pulse, with a different one of the 16 negative-going transitions in the digit timing waveform at the output of the gate 170 over this period. During this time, 16 digits are received sequentially at the output of each of a pair of integrators 180 and 182, the inputs of which are connected to the outputs of the linear multipliers 160 and 164. The output of each integrator 180, 182 is connected to a respective sample gate and store circuit 184, 186. Each of the terminals 179 is associated with a different capacitor store in each of the sample, gate and store circuits 184 and 186. Over the first 10 milliseconds of an 80-baud element period, every digit at the output of each integrator 180, 182 is sampled at the end of the digit period, by a different sampling pulse and stored in the corresponding capacitor store. A digit is held in its store until replaced by the appropriate digit in the next 80-baud element period. Immediately the output signal from an integrator 180,182 has been sampled and stored, the integrator output signal is reset to zero, ready for the next integration process.

The last four of the 20 digits in each 80-baud element period, at the output of each integrator, are not sampled and stored, since these do not carry any data signals. The output signal from each integrator is nevertheless reset to zero at the end of each of these digit periods.

Figure 6:
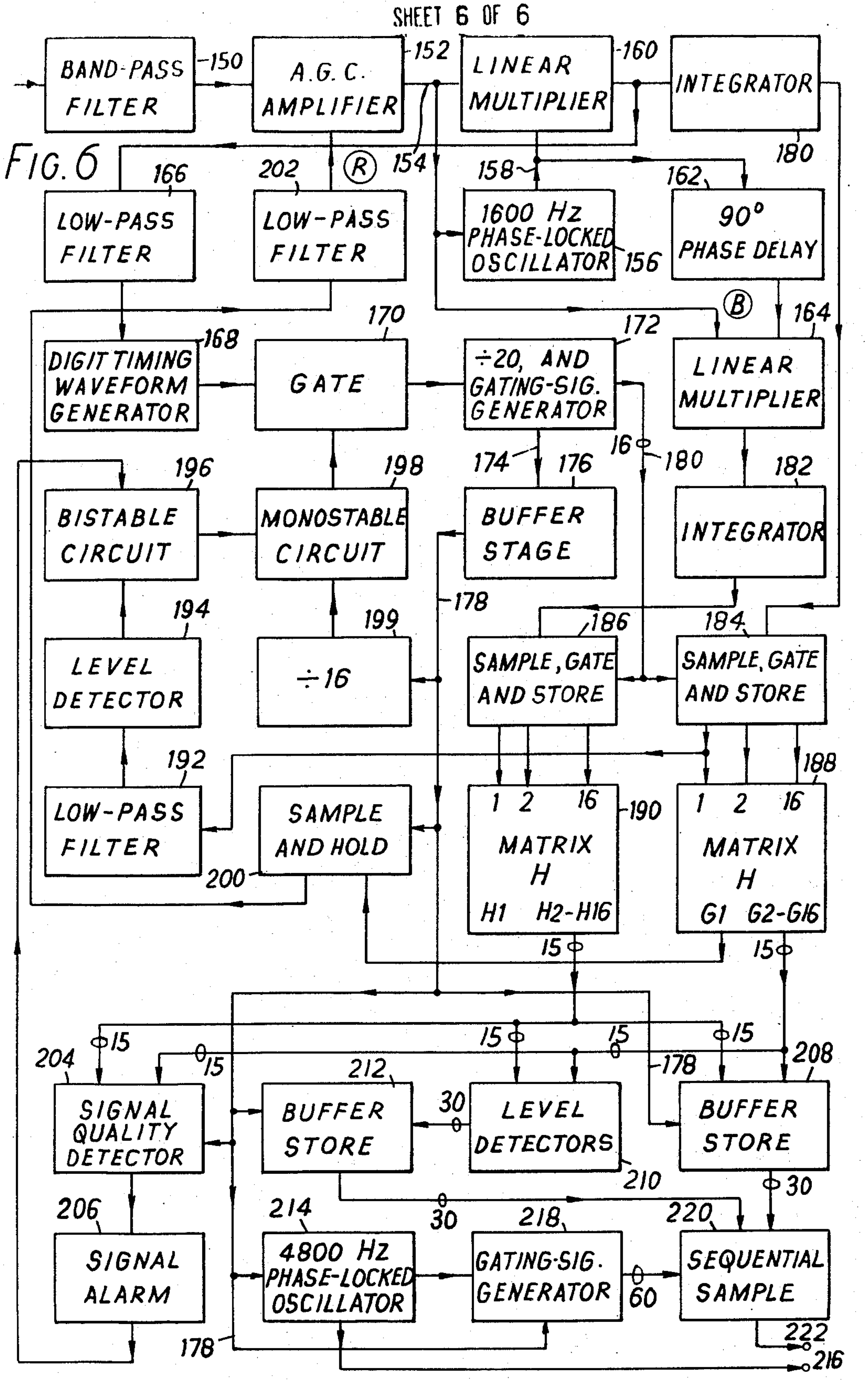
FIG. 6 is a block schematic diagram of a receiver for use with the transmitter shown in FIG. 6.

In the receiver of FIG. 6, the linear multipliers 160 and 164 are used in place of the switched inverter 46 and the integrators 180 and 182 in place of the low-pass filter 48 (FIG. 3), so that each coherent detector can isolate more effectively the wanted (in phase) signal at terminal 154 from the unwanted (quadrature) signal. The response of a coherent detector to the quadrature input signal, should be negligibly small.

At a negative-going transition in the element, timing waveform on lead 178 which marks the end of an 80-baud element period, the 16 output signals from each sample, gate and store circuit 184, 186, contain the first 16 digit values for the element of the corresponding in-phase signal at terminal 154 just received. Each set of 16 signals is fed to the input terminals of a corresponding matrix 188, 190, such that the *n*th input terminal receives the *n*th digit in the group of 16. The 15 output signals on output terminals G2 . . . G16, H2 . . . H16 of matrices 188, 190 at this instant, are the detected values of 15 multiplexed 80-baud four-level elements, of the corresponding in-phase signal terminal 154.

In order to bring the element timing waveform into the correct phase at the start of a transmission, the input data to the transmitter is set to all "0's" and held in this condition for about 9 seconds. The method by which the phase of the element timing waveform is adjusted to its correct value at the receiver, is exactly as previously described, employing gate 170, low-pass filter 192, level detector 194, bistable circuit 196, monostable circuit 198 and divide-by-16 circuit 199 to replace the corresponding unit 52, 62, 64, 66 70 and 72 of FIG. 3. The control of the a.g.c. amplifier and the operation of the signal quality detector are also as previously described, the sample and hold circuit 200, low-pass filter 202 signal quality detector 204 and signal alarm circuit 206 replacing the corresponding units 74, 76, 78 and 68 of FIG. 3, except that the latter circuit now monitors the output signals from the two matrices 188 and 190.

The signals at the output terminals G2 . . . G16 and H2 . . . H16 of each matrix 188,190 are fed to a buffer store 208 and level detectors 210.

The buffer store 208 contains thirty bistable circuits, each of which is fed from a different terminator G2 . . . G16 H2 . . . H16. Each has a positive or negative output voltage. At each negative-going transition in the element timing waveform on lead 178, each bistable circuit is set to give an output signal having the same sign as its input signal.

There are 30 level detectors 210, each of which is fed from a different terminal G2 . . . G16 H2 . . . H16. The sign of the output signal of a level detector is the same as that of the difference between the magnitude of the input signal and 2 volts. If the magnitude of the input signal is greater than 2 volts, the level detector output signal is positive. If it is less than 2 volts, the output signal is negative.

Each of the level detectors 210 feeds a respective bistable circuit in the buffer store 212. Each bistable circuit has a positive or negative output voltage. At a negative-going transition of the element timing waveform on lead 178, each bistable circuit is set to give an output signal having the same sign as its input signal.

During an 80-baud element period, the output signals from the two bistable circuits, one in the buffer store 208 and the other in the buffer store 212, which are fed from the *n*th output terminal of the matrix 190, (whose output terminal H1 is disconnected), are the input binary data signals Nos. $2n$-3 and $2n$-2 respectively, in the corresponding group of 60 of the latter signals at the transmitter. The output signals from the two bistable circuits, one in the buffer store 208 and the other in the buffer store 212, which are fed from the nth output terminal of the other matrix 188 (whose output terminal G1 feeds the sample and hold circuit 200), are the input binary data signals Nos. $2n$+27 and $2n$+28 in the corresponding group of 60 of the latter signals at the transmitter.

A 4,800 Hz phase-locked oscillator 214 is synchronized to the element timing waveform on lead 178. One of its two square-wave output signals is fed as the timing signal at terminal 216, to the equipment associated with the receiver. The other of its output signals is in anti-phase with the first signal and is fed to a gating-signal generator 218. The latter is phased by the element timing waveform on lead 178 and has 60 output terminals. Each of these carries a different sampling pulse over the duration of an 80-baud element, and over this period each sampling pulse has a different one of the 60 negative-going transitions in the waveform at the output of the 4,800 Hz oscillator 214.

The 60 outputs of the gating signal generator 218 are applied to a sequential sampler 220 where each of the sixty outputs is associated with a different output terminal from the buffer stores 208 and 212 in such a way that the sixty output signals from the buffer stores 208 and 212 are sampled sequentially and in the correct order, to give the output binary data signal at terminal 222. In the absence of noise and excessive distortion in the transmission path, the 4,800 baud binary data signal at terminal 222 is a delayed copy of the input binary data signal at the transmitter.

The effect of distortion introduced in the transmission path will now be considered. Suppose that the transmission path introduces attenuation and delay distortions, such that the signal voltages at the 16 input terminals of either transformation matrix H, at a negative-going transition of the element timing waveform at terminal 178, are the 16 components of the column-vector Z, where $$Z \neq Y \quad (7)$$

and $$Y = H\chi \quad (8)$$

$\chi$ is the corresponding input signal vector at the appropriate matrix H in the transmitter.

Assume that the signal distortion is linear and is such that the received signal waveform of a total 80-baud element never overlaps the 10 millisecond detected portion of an adjacent 80-baud element. This means that the effective duration of a received signal-element is not extended by more than 2.5 milliseconds at either the leading or trailing edge, relative to its nominal duration of 10 milliseconds. Within these restrictions, the duration of a received signal-element may clearly increase to 16 milliseconds. Finally, assume that the orthogonality of the two resultant elements, whose carriers are in phase quadrature and which make up a total received element, remains undisturbed. Under these conditions, $$Z = DY = DH\chi \quad (9)$$

where $D$ is a 16 × 16 transformation matrix which can be assumed to be constant with time where the transmission path is a telephone circuit, but which varies slowly with time where the transmission path is an H.F. radio link. $D$ is independent of the data transmitted and is normally non-singular. Clearly $$X = H^{-1} D^{-1}Z = HD^{-1}Z \quad (10)$$

Thus to eliminate the signal distortion and so obtain correct detection of the received signals, each of the two transformation matrices H at the receiver must be replaced by a transformation matrix, $$G = HD^{-1} \quad (11)$$

Where the various assumptions made above do not all hold accurately, a considerable reduction in signal distortion should still be obtained by using an appropriate transformation matrix G in place of each matrix H at the receiver.

For the matrix D to be independent of the transmitted data, it is essential that the two resultant elements, whose carriers are in phase quadrature and which make up a total received element, are orthogonal over the detected portion of the element. It is also essential that the gap between the data-carrying portions (detected portions) of two adjacent 80-baud elements, is wide enough to ensure that a received element does not overlap into the data-carrying portion of an adjacent element.

Where the signal distortion in transmission is such that a larger gap is required between the data-carrying portions of adjacent elements, the digit rate can be increased to give more than 20 digits in an 80-baud element, the additional digits carrying no data and being the same as the last four digits in an 80-baud element of the arrangement just described. Alternatively, the element duration can be increased to more than 12.5 milliseconds the digit rate remaining at 1,600 digits per second. To maintain the transmission rate at 4,800 bits/second, some or all of the 30 individual signal-elements which make up a total element, must carry more than two bits of information and so must use more than four levels.

Where the signal distortion is such that the two resultant elements, whose carriers are in phase quadrature and which make up a total element, are no longer sufficiently nearly orthogonal, only a single modulated carrier must be used, as in FIGS. 1 to 4. To maintain the transmission rate at 4,800 bits/second, without requiring each of the 30 individual signal-elements to carry four bits of information and so have 16 different levels, vestigial sideband transmission may be used, with the carrier frequency placed at the upper end of the available frequency band. With each individual signal-element carrying three bits of information and so having eight different levels, a sufficiently large gap can be obtained between the data-carrying portions of adjacent elements.

I claim:

1. For use in a code division multiplex electrical signalling system in which digital signals are transmitted at a lower element rate than that of the signals to be transmitted, a receiver comprising sampling means for sampling the received signal once during each element thereof to produce a first plurality of multi-level signals, matrix means comprising at least one orthogonal transformation matrix responsive to said sampling means for producing a second plurality of multi-level signals from said first plurality thereof and decoding means responsive to said matrix means for producing a plurality of signal elements from each multi-level signal of said second plurality thereof, wherein said decoding means comprises polarity detection and level detection means adapted to produce a respective first binary signal and a respective second binary signal for each multi-level signal of said second plurality thereof, each of said first binary signals having the same polarity as the corresponding multilevel signal and each of said second binary signals having a first polarity when the corresponding multi-level signal has a magnitude greater than a predetermined level and a second polarity when said corresponding multi-level signal has a polarity less than said predetermined level.

2. A receiver as claimed in claim 1, including demodulation means comprising a phase-locked oscillator and a switched inverter.

3. A receiver as claimed in claim 1, in which said matrix means comprises a single transformation matrix.

4. A receiver as claimed in claim 1, in which said matrix means comprises first and second transformation matrices, the first transformation matrix being arranged to be responsive to signals modulating a first carrier signal and the second transformation matrix being arranged to be responsive to signals transmitted by a second carrier signal having the same frequency as the first carrier signal but being in phase-quadrature thereto.

* * * * *